March 10, 1931. H. M. DENYES 1,795,928

YIELDABLE PITMAN ARM

Filed May 13, 1929

Inventor
Harry M. Denyes
By Blackmore, Spencer & Hark
Attorneys

Patented Mar. 10, 1931

1,795,928

UNITED STATES PATENT OFFICE

HARRY M. DENYES, OF SAGINAW, MICHIGAN, ASSIGNOR TO GENERAL MOTORS CORPORATION, OF DETROIT, MICHIGAN, A CORPORATION OF DELAWARE

YIELDABLE PITMAN ARM

Application filed May 13, 1929. Serial No. 362,625.

This invention relates to steering gear for motor vehicles and, more particularly, to an improved type of pitman arm.

The invention has for one of its objects, the provision of an improved pitman arm which may be readily substituted for and replace the ordinary pitman arm between the rock shaft of the steering column and the drag bar of the steering linkage without necessitating any change in the design of these conventional parts, whereby it may be applied with equal facility to either new cars or those already in use.

A further and important object of the invention is to provide a pitman arm in which is incorporated an arrangement for cushioning road shocks, wheel wobble, and the like, whereby damaging stresses on the steering gear mechanism is reduced and the ease of handling and steering a vehicle is greatly increased, especially to the extent of relieving the driver of fatiguing strains due to the sharp reactions in the steering gear incident to vehicle travel.

Additional objects and advantages, such as for instance simplicity in design, manufacturing economy, ease in assembling, and subsequent servicing operations, will be apparent from the following specification of a preferred but not necessarily the only embodiment of the invention shown in the accompanying drawing.

In this drawing

Figure 1:
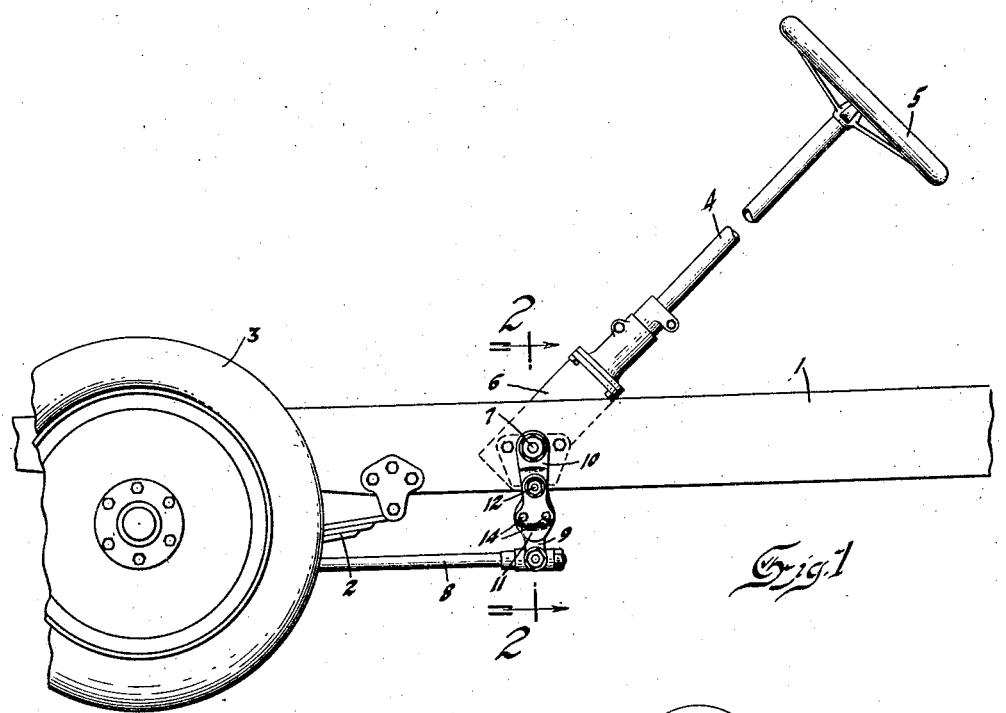
Figure 1 is a side elevation of a portion of a chassis frame in which is embodied the present invention.
Figure 2:
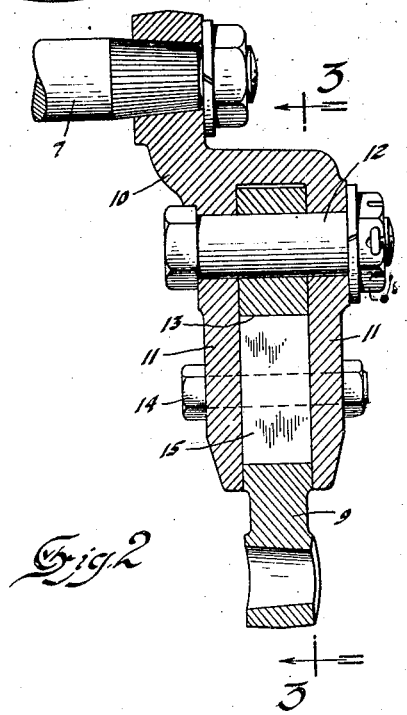
Figure 2 is a sectional view taken on line 2—2 of Figure 1.
Figure 3:
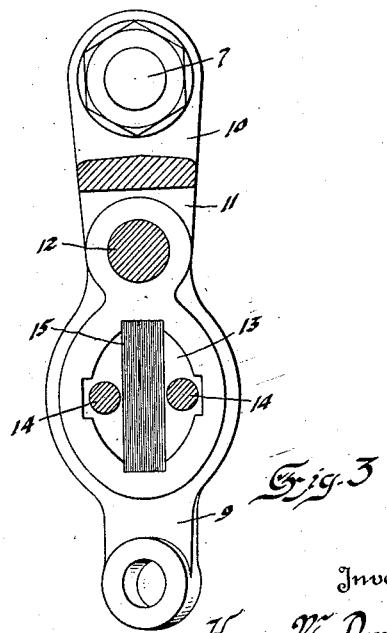
Figure 3 is a view taken on line 3—3 of Figure 2.

Referring particularly to the drawing, the numeral 1 indicates a chassis frame supported upon multiple leaf springs 2, on a front axle having a pair of wheels 3 swivelled at opposite ends. Supported on the chassis frame is a steering column 4, having a steering wheel 5 at its upper end and a housing or casing 6 at its lower end, enclosing suitable gear mechanism for transmitting the movement of the steering wheel 5 to a laterally projecting rock shaft 7, connected by a pitman arm to a drag bar 8, forming a part of a conventional steering gear linkage.

In the present case, the pitman arm is preferably made up in sections consisting of inter-connected arms 9 and 10, pivoted to one end of the drag bar 8, and keyed or splined on the rock shaft 7 respectively. The rock shaft section 10 is shown as being provided with a pair of forks or dependent arms 11, which straddle and receive the upper end of the drag bar section 9. A pivot pin 12 extending through the forks 11 serves to pivotally mount the section 9 for swinging movement between the two forks. Intermediate its length, a section 9 is provided with an aperture or opening 13 of suitable outline, and through which project a pair of spaced pins 14 carried by the forks 11, forming in effect a pin and slot connection between the two sections and in spaced relation with the pivotal connection and serving to limit the extent of swinging movement of the section 9 about the pivot pin 12 relative to the section 10. The limit of movement is pre-determined according to the spacing of the pins 14 and their relation with the side walls of the opening 13 with which the pins abut. A series of spring leaves 15 are secured at opposite ends in grooves in the section 9 at the top and bottom of the opening 13 and extend through and completely fill the space between the pins 14 so as to contact with the pins at an intermediate portion thereof. The elasticity of the spring leaves tends to yieldingly maintain the two sections in centered relation and affords spring resistance to the relative movement of the sections.

When the driver or operator turns the steering wheel 5, the arm 11 is rocked with the shaft 7 and the movement is transmitted to the section 9 through the springs 15 to push or pull on the drag link and swing the front wheels. In the transmission of this movement between the sections, the spring may or may not be deflected, depending on the resistance offered by the road wheels. At times, when the resistance is great, the spring may be fully deflected until one or the other of the pins 14 is moved into abutting contact with the adjacent wall of the opening 13, after which the arm 9 moves in positive unison with the section 10. At such times as when the drag bar 8 is forcibly moved or violently reciprocated because of road shocks, wheel wobble, or the like, the lower section 9 will tend to swing about its pivot to and fro within the limits afforded between the adjacent surfaces of the pins 14 and the respective abutments or adjacent wall of the opening 13. During such relative movements, the elasticity of the spring 15 offers a yielding resistance which damps or cushions these movements and relieves the steering column mechanism from the imposition of damaging stresses and prevents fatiguing strains reaching the operator.

While the device has been described more or less specifically, it is to be understood that the invention is not limited to the exact details referred to but that such modifications may be made as come within the scope of the appended claims.

I claim:

1. Motion transmitting means, including a pair of arms, a pivot pin connecting said arms for relative swinging movement, a pair of spaced pins projecting from one of the arms through an opening in the other arm, and a spring element carried by the last-mentioned arm in the space between said pins affording yielding resistance to the swinging movement of said arms.

2. An articulated pitman arm of the character described, comprising a pair of jointed sections pivoted one to the other at their adjacent ends for relative movement and connected at the remote ends with driven and driving members respectively, one of said sections having a pair of spaced projections and the other having abutment portions for contact with said projections to limit movement thereof, an elastic element carried by the last mentioned section and interposed between said projections for engagement with one or the other thereof to yieldingly resist to or fro swinging movement of the sections.

3. A pitman arm of the character described, comprising two sections pivoted together in overlapping relation for relative swinging movement, one of the sections having an opening therethrough, a pair of spaced lateral projections on the other section extending through the opening and adapted, upon relative movement of the sections, to engage with the walls of the opening to limit the extent of movement and elastic means mounted on the first section in said opening and extending through the space between said projections and adapted to be engaged by said projections upon the relative movement of the sections to yieldingly resist such movement.

4. A sectional pitman arm of the character described, comprising a rock shaft section and a drag link section, a pivot pin connecting the sections in overlapping relation for relative swinging movement, a pair of spaced projections on the rock shaft section, a pair of spaced abutment surfaces on the drag link section adapted for contact with said projections to limit the degree of relative swinging movement of the sections, and a flat multiple leaf spring carried by the drag link section and extending through the space between said projections for deflection to cushion the relative movement of the sections within the limits before referred to.

5. A pitman arm of the character described, comprising an apertured section and a forked section straddling the apertured section, a pivot connection between the forks and apertured section, a pair of spaced pins projecting between the forks and through the aperture in pre-determined relation with the walls of the aperture for abutment with said walls to limit the extent of swinging movement of the sections, and a flat multiple leaf spring secured at its ends to the apertured section and extending through the space between the pins and contacting the pins at an intermediate portion thereof, whereby its elasticity tends to maintain the sections in centered relation and offer yielding resistance to movement in either direction.

In testimony whereof I affix my signature.

HARRY M. DENYES.